United States Patent [19]

Kojima

[11] 4,229,923
[45] Oct. 28, 1980

[54] METHOD OF CONNECTING PIPES AND FLANGED PIPE JOINTS USED THEREIN

[76] Inventor: Noriatsu Kojima, 5-31, Yanagishima-cho, Nakagawa-ku, Nagoya-shi, Japan

[21] Appl. No.: 833,410

[22] Filed: Sep. 15, 1977

[30] Foreign Application Priority Data

Sep. 16, 1976 [JP] Japan .................................. 51/111213
May 31, 1977 [JP] Japan .................................. 52/63733

[51] Int. Cl.² .............................................. E04B 5/48
[52] U.S. Cl. ...................................... 52/741; 285/158
[58] Field of Search ................ 285/42, 158; 52/220, 52/221, 741

[56] References Cited

U.S. PATENT DOCUMENTS

| 469,005 | 2/1892 | Anderson | 52/220 |
|---|---|---|---|
| 1,688,921 | 10/1928 | Dows | 285/158 |
| 1,798,152 | 3/1931 | Farley | 52/221 |
| 1,962,915 | 6/1934 | Sharp | 52/221 |
| 2,202,147 | 5/1940 | Gerriets | 52/220 |
| 2,463,405 | 3/1949 | McMaster | 285/158 |

FOREIGN PATENT DOCUMENTS

| 74039 | 4/1952 | Denmark | 52/2 20 |
|---|---|---|---|
| 720741 | 2/1932 | France | 285/158 |
| 300709 | 9/1965 | Netherlands | 285/158 |

Primary Examiner—James A. Leppink
Assistant Examiner—Henry E. Raduazo
Attorney, Agent, or Firm—Irvin A. Lavine

[57] ABSTRACT

A method of connecting pipes for pipelines in a multi-storied building and a flanged pipe joint used therein. The method comprises making a through-hole in a wall or floor portion of the building through which pipes are connected, the through-hole being larger in diameter than the pipes to be connected; providing a pair of anchor bolts in the building portion on both sides of the through-hole; covering the through-hole via an elastic gasket with a pipe joint provided with a flange having a pair of collars oppositely projecting therefrom; connecting the pipe joint with the pipes to be connected; and securing the collars to the building portion by the anchor bolts to seal the through-hole so as to prevent leakage of fluid therefrom. The pipe joint has a central bore at one end to receive one of the pipes to be connected via an elastic packing, another central bore at the other end to receive the other pipe and a flange to be secured to the building portion via an elastic packing in an air-tight manner to seal the through-hole.

2 Claims, 17 Drawing Figures

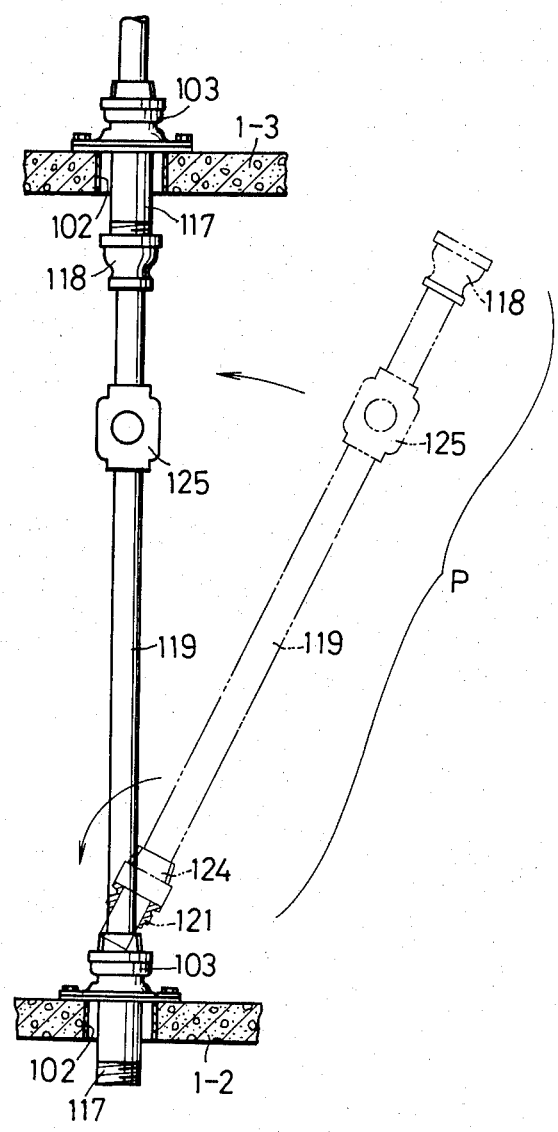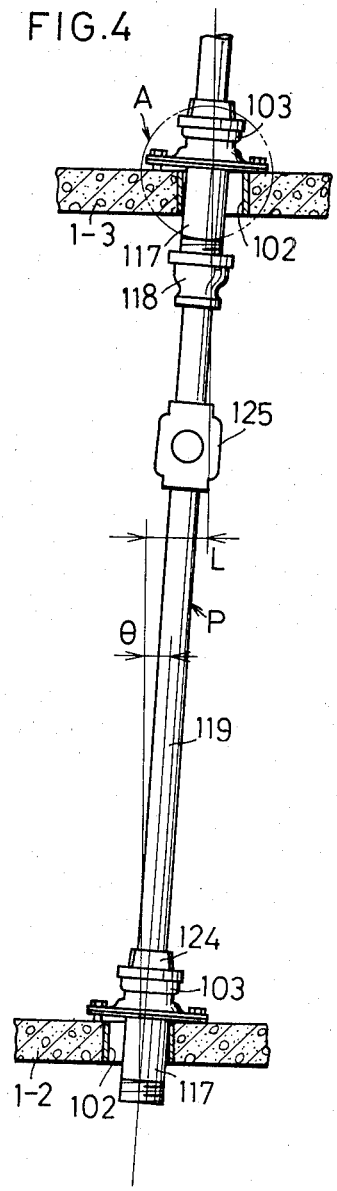
FIG.3
FIG.4

METHOD OF CONNECTING PIPES AND FLANGED PIPE JOINTS USED THEREIN

The present invention relates to a method of connecting pipes to install pipelines utilized in construction of multistoried buildings, and flanged pipe joints used therein.

When pipes are connected to install pipelines, various kinds of differences or deviations may develop between the pipes to be connected. The principal differences or deviations are as follows:

(a) Longitudinal differences, i.e., differences in the distance between a pair of pipes to be connected;

(b) Axial deviation of one pipe from the other, e.g., vertical deviation in a horizontal connection and horizontal deviation in a vertical connection; and (c) Angular differences between a pair of pipes to be connected.

Further, in operation, pipes may cause expansion, contraction or displacement under heat and shake of the building may cause cracks or severances of the pipes, leading to leakage of fluid from the pipes.

There have been practiced many methods of piping work for a building, such as extension piping in which pipelines are successively extended from one story to another and unit piping in which piping work is individually performed in each story as a unit, and the units are connected with each other by flexible tubes. In the former method, aforementioned differences and deviations developed between the pipes are gradually cumulated to cause concentration of stress in the pipelines, and further, it is difficult to deal with various displacements caused by expansion and contraction of pipes and shake of the building. In the latter method, the building must be constructed with strict accuracy leading to expensive building cost, and the pipelines lack durability since the flexible tubes adapted to connect the units are not so durable as other piping members.

In both of the aforementioned methods, gaps are formed between the pipes and through-holes in floor boards and wainscots that may cause spread of fire and leakage of toxic gases when the building is on fire.

In the piping work for a building, it is necessary to fill up gaps between through-holes in fire zones such as fireproof walls and floors and pipes such as feed pipes, drain pipes and distribution pipes with packings of noncombustible materials, e.g., asbestos or calkings of lead. However, this filling work, i.e., back-filling is not always performed completely because of technical and economical difficulties, leading to spread of fire and leakage of toxic gases when the building is on fire. Consequently, there has been expected provision of a novel and improved method to overcome the above-mentioned disadvantages.

It is, therefore, an object of the present invention to provide a method of connecting pipes in which pipes are connected by pipe joints which can absorb differences and deviations therebetween and fill up gaps between pipes and through-holes in each unit of pipelines installed individually in each story of a building, so as to prevent concentration of stress and leakage of fluid from the pipes through cracks or severances thereof.

It is another object of the present invention to provide a method of connecting pipes and flanged pipe joints used therein which can fill up gaps between the pipes and through-holes in fire zones such as fireproof walls and floors without necessity of back-filling, and prevent spread of fire and leakage of toxic gases when the building is on fire.

It is still another object of the present invention to provide a method of connecting pipes and flanged pipe joints used therein which can simplify the piping work and reduce the time therefor by fitting a separable flange to a pipe joint having a central bore to fit with one of the pipes to be connected and another central bore to fit with the other pipe.

The invention will now be described in further detail by way of example with reference to the accompanying drawings, in which:

FIG. 3 is a front elevational view showing a vertical pipeline extending between one floor to another;

FIG. 4 is a front elevational view similar to FIG. 3 showing the manner to absorb axial deviation between the pipes;

In FIGS. 1 to 7 of the drawings, there is shown a preferred embodiment of the present invention in which pipes are connected vertically by a flanged pipe joint inserted in a through-hole provided in a concrete floor of a building.

The pipe joint comprises a central bore formed in one end thereof in which one of a pair of pipes to be connected is slidably received via an elastic packing, a connecting portion formed at the other end to receive the other pipe and a flange which covers said through-hole via said elastic packing in an air-tight manner. The pipe joint is displaceable in a desired direction in a gap formed between the inner periphery of said through-hole and the pipe since the pipe joint is supported in a suspended manner.

The pipe joint provided in a suspended manner is adapted to connect main pipes. The main pipe is mounted with a special-formed joint such as an increaser which is connected with the lower end of said pipe joint at the upper end, engaged with a flexible packing and a gland therefor at the lower end, and mounted with a multithread pipe joint for connection with branch pipes. The main pipe thus prepared must be long enough to be connected between two pipe joints to permit the lower end of the main pipe to be sufficiently received in the pipe joint provided in the floor when the increaser mounted to the upper end thereof is connected with the lower end of the other pipe joint in the floor of the upper adjacent story.

Also in another embodiment of the present invention in which pipes are connected horizontally, the flanged pipe joint is inserted in a through-hole provided in a wall of the building.

Figure 1:
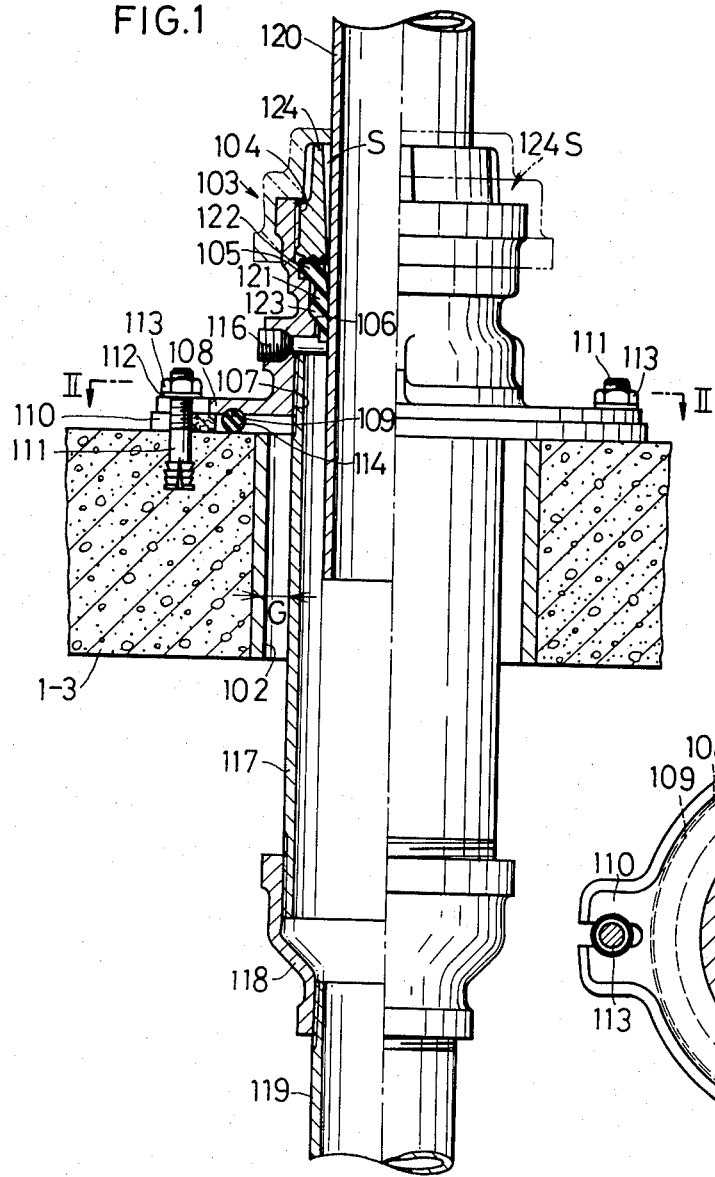
FIG. 1 is a fragmentary front elevational view partly in section of a pipeline in which two pipes are vertically connected by a flanged pipe joint of the present invention.
Figure 2:
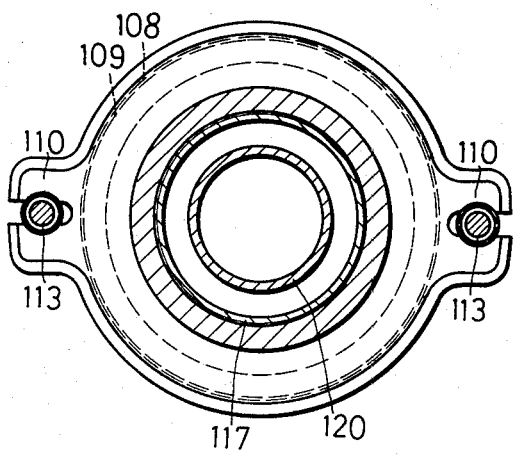
FIG. 2 is a cross-sectional view taken along the line II—II of FIG. 1.
Figure 5:
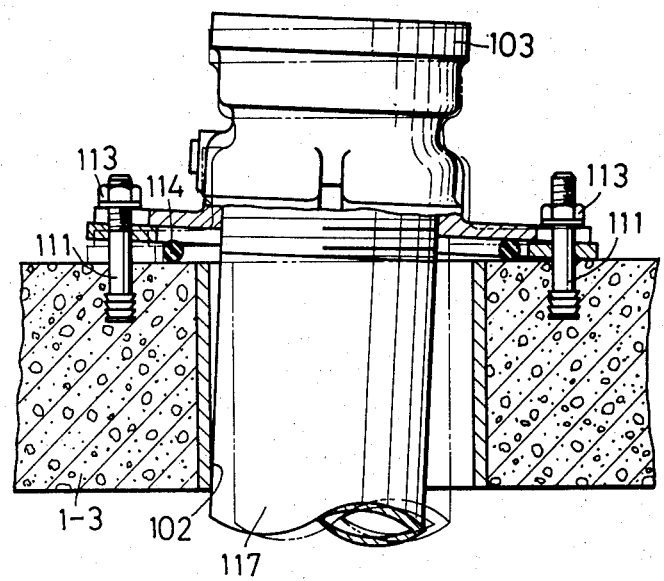
FIG. 5 is an enlarged view partly in section of a portion "A" of FIG. 4.

Referring now to FIGS. 1 and 2 of the drawings, a pipeline extends between and through a concrete slab for the floor of the third story (1-3) and a concrete slab for the second story (1-2) (FIGS. 3 and 4). A sleeve 102 is fitted in a through-hole provided in the slab (1-3) to define a gap G between the inner periphery of the sleeve 102 and the outer periphery of an interconnecting pipe 117. A flanged pipe joint 103 of the present invention is substantially in the form of a cylinder provided with an upper internal thread 104 in the upper portion of the inner periphery thereof to receive an attachment 124 which works as a packing gland. The pipe joint 103 has engage surfaces 105 and 106 which are stepped to fit with upper and lower flanges 122, 123 of an annular elastic packing 121. The upper end of the interconnecting pipe 117 is received in a lower internal thread 107 provided in the lower portion of the inner periphery of the pipe joint 103. An annular flange 108 is provided integrally with the lower end of the pipe joint 103, and the lower surface of the pipe joint 103 is formed with an annular groove 109 adapted to receive an elastic gasket in the form of an O-ring 114. The pipe joint 103 is fixed to the slab (1-3) at a diametrically opposite pair of forked collars 110 projecting from the outer periphery of the flange 108 by a pair of anchor bolts 111 which are inserted into the upper portion of the slab (1-3) to secure the collars 110 thereto by a pair of washers 112 and a pair of nuts 113.

The O-ring 114 is received in the groove 109 on the lower surface of flange 108. An air plug 116 is threaded into the side surface of the pipe joint 103 between the engage surface 106 and the lower internal thread 107. The lower end of the interconnecting pipe 117 is fitted in a special-formed joint 118 which in turn receives the upper end of a main pipe 119 to be set in the second story. The other main pipe 120 to be set in the third story is inserted through the central bore of the pipe joint 103 sufficiently deep to accommodate itself to displacement in the longitudinal direction. The elastic packing 121 is provided in the form of a funnel-shaped conical cylinder comprising upper and lower flanges 122, 123 adapted to fit the engage surfaces 105, 106 of the pipe joint 103. The elastic packing 121 is inserted between the inner periphery of the pipe joint 103 and the outer periphery of the main pipe 120 to be pressed by the attachment 124 threaded in the upper internal thread in an air-tight manner. The attachment 124 is enclosed with a sealing member 124S of elastic material such as rubber to prevent foreign matter from falling into a space S between the attachment 124 and the main pipe 120.

In construction, a sleeve 102 is fitted in the through-hole of each of the slabs (1-3) (1-2) in which, in turn, the anchor bolts 111 are inserted. Then the interconnecting pipe 117 is connected with the pipe joint 103 and inserted into the sleeve 102, with insertion of the O-ring 114 into the groove 109 and engagement of the forked collars 110 with the anchor bolts 111. Thereafter the elastic packing 121 and the attachment 124 are inserted into the pipe joint 103.

The main pipe 119 is connected with the special-formed joint 118 at the upper end thereof, and mounted with a multithread pipe joint 125 for branch pipes at an intermediate portion thereof (see FIG. 3). The pipe assembly thus prepared is hereinafter indicated as P.

The lower end of the pipe assembly P is inserted into the other pipe joint 103 to be secured to the other slab (1-2) of the second story while the special-formed joint 118 in the upper end of the pipe assembly P receives the lower end of the interconnecting pipe 117 (FIG. 3). The pipe assembly P is set so as to enable the multithread pipe joint 125 to be connected with the branch pipes (not shown).

When the two sleeves 102 are not coaxial with each other, but the center line of the sleeve 102 in the slab (1-3) deviates from that of the sleeve 102 in the slab (1-2) at a length L in FIG. 4, the pipe joints 103 are displaced in the opposite directions so that the inner periphery of the sleeve 102 in the slab (1-3) engages with the outer periphery of the interconnecting pipe 117. Thus, the pipe assembly P is kept inclined at an angle $\theta$ against the vertical line.

After connection with the pipe assembly P, the pipe joint 103 is secured to the slab (1-3) by the anchor bolts 111, the nuts 113 and the washers 112. The space between the lower surface of the flange 108 and the upper surface of the slab (1-3) is kept airtight by the O-ring 114.

In the method of the present invention, the pipe joint 103 and the main pipe 120 in the third story are connected movably relative to each other by the elastic packing 121 and the pipe joint 103 is movably supported against the slab (1-3) by the O-ring 114 so that the main pipe 119 in the second story and the main pipe 120 in the third story are connected with each other by the pipe joint 103 in a flexible manner. Thus, the longitudinal differences, axial deviations and angular differences that may develop between the pipe assemblies P are effectively absorbed in each story so as to prevent displacement, contraction and expansion of the pipe assemblies, cracks and severances of the pipes and leakage of fluid from the pipes. In addition, the space between the inner periphery of the sleeve 102 and the outer periphery of the interconnecting pipe 117 is prevented from communicating with the interior of the upper story by the O-ring 114 so as to prevent leakage of smoke, flame or gas.

This embodiment of the present invention may be modified to connect pipes horizontally through partition walls.

Figure 6:
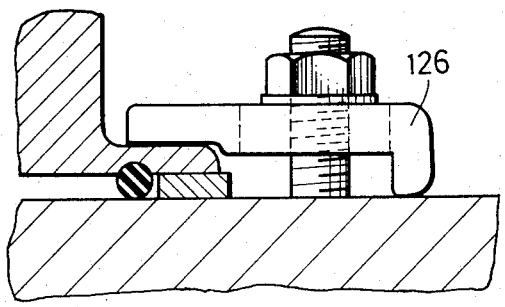
FIG. 6 is a partially enlarged view of FIG. 5 showing a modification of the manner to secure the pipe joint.
Figure 7:
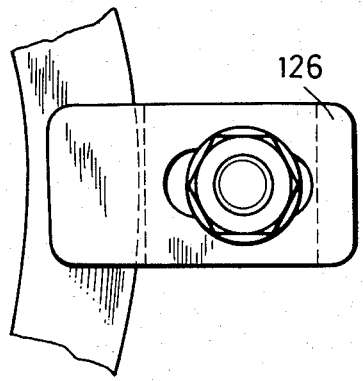
FIG. 7 is a partial top plan view of FIG. 6.

FIGS. 6 and 7 show a modification of the embodiment in which the pipe joint is secured by a rectangular pawl 126 having a slot for a bolt.

The pipe joint 103 can also be adapted to angular adjustment between pipes besides axial adjustment shown in FIG. 4.

Further, the pipe joint 103 can be provided not only in a concentric design as described but in a deflected or a declined design.

The pipe can directly be connected with the pipe joint of the present invention by itself not as a pipe assembly as shown in FIG. 4.

Also it is possible to directly connect the pipes with each other by the pipe joint without using the interconnecting pipe.

As hereinabove described, various deflections and deviations that may develop between pipes to be connected are effectively absorbed in each story. In the method of the present invention, all pipes are connected in a movable manner to prevent concentration of stress, displacement of the pipes caused by such as thermal contraction and expansion and leakage of fluid caused by cracks and severances of the pipes due to shake or subsidence of the building. Further, the pipes are prevented from getting damaged since the through-holes are larger in diameter than the pipes.

Attention is now drawn to FIGS. 8 to 17 showing other embodiments of the present invention, in which pipe joints with movable flanges are used.

Figure 8:
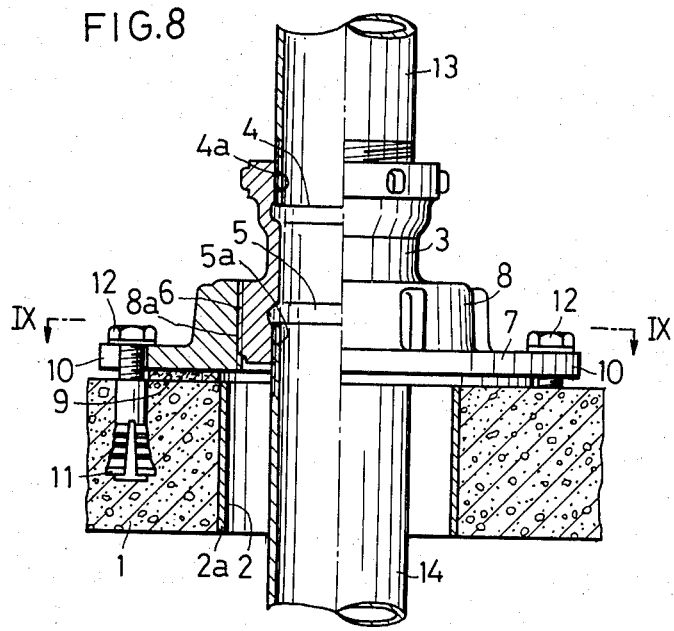
FIG. 8 is a fragmentary front elevational view partly in section of a pipeline showing another embodiment of the present invention in which a pipe joint having a movable flange is used.
Figure 9:
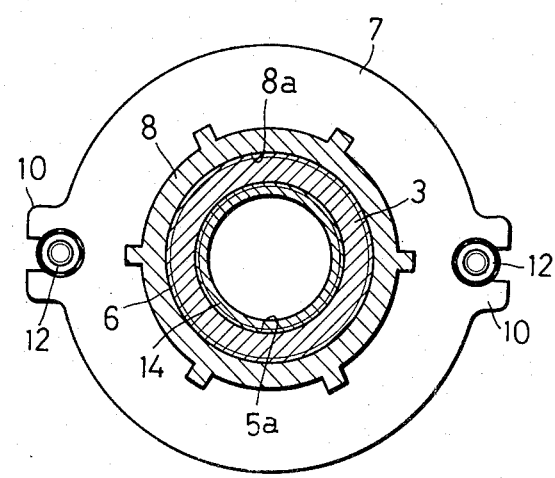
FIG. 9 is a cross-sectional view taken along the line IX—IX of FIG. 8.

Referring to FIGS. 8 and 9, a fireproof floor slab 1 is provided with a through-hole 2 in which a sleeve 2a is fitted. A cylindrical pipe joint 3 to be secured to the slab 1 comprises upper and lower central bores 4 and 5 having upper and lower internal threads 4a and 5a adapted to receive pipes 13 and 14 respectively. The pipe joint 3 further comprises an external thread 6 in the lower portion of the outer periphery thereof. An annular movable flange 7 is adjustably mounted to the pipe joint 3 by engagement of an internal thread 8a of a boss 8 thereof with the external thread 6 of the pipe joint 3. The movable flange 7 having a diameter large enough to cover the through-hole 2 seals the through-hole 2 via an elastic gasket 9. The movable flange 7 is secured to the slab 1 at a pair of forked lugs 10 oppositely projecting from the outer periphery thereof by a pair of bolts 12 which are inserted into a pair of hole-in anchors 11 provided in the slab 1.

In construction, the sleeve 2a is fitted in the through-hole 2 of the slab 1 in which, in turn, the hole-in anchors 11 are inserted. Then the movable flange 7 is mounted to the pipe joint 3 and moved to a certain position, and thereafter the upper pipe 13 is inserted into the upper central bore 4 of the pipe joint 3, and the lower pipe 14 is inserted into the lower central bore 5 through the through-hole 2 of the slab 1 with insertion of the elastic gasket 9 between the lower surface of the movable flange 7 and the upper surface of the slab 1. Thus, the upper and lower pipes 13 and 14 are connected with each other by the pipe joint 3, and the position of the pipe joint 3 is determined.

Then the flange 7 is moved to press the upper surface of the slab 1 via the gasket 9, and secured to the slab 1 by the bolts 12 after the lugs 10 are matched with the hole-in anchors 11. Namely, the through-hole 2 is completely sealed by the flange 7 pressing the upper surface of the slab 1. Consequently, it is possible to prevent spread of fire or leakage of toxic gas through the through-hole 2 without back-filling by mortar or other noncombustible material. Further, since the flange 7 is movable along the pipe joint 3, the flange 7 can absorb displacement of the pipe joint 3 caused by difference in length between the pipes 13 and 14.

Figure 10:
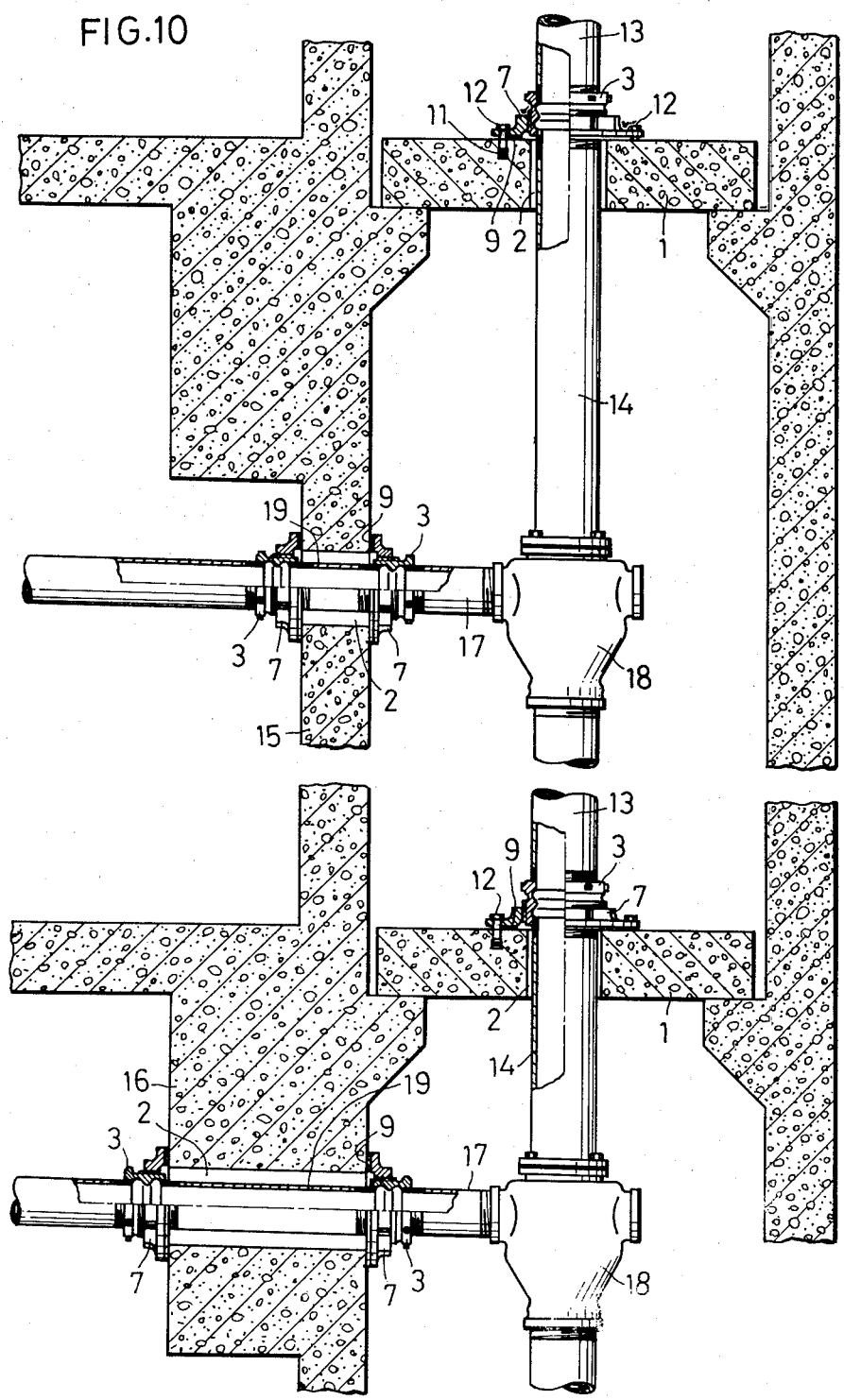
FIG. 10 is a fragmentary front elevational view showing the piping work in which pipes are vertically and horizontally connected.

Attention is now drawn to FIG. 10 in which the pipe joint 3 is applied to connect pipes through a partition wall 15 or a beam 16 of the building. As shown in FIG. 10, when a horizontal pipe 17 is connected to vertical pipes 13 and 14, a multithread pipe joint 18 is utilized at the junction, and when two horizontal pipes 17 are to be connected through the partition wall 15 or beam 16, a pair of pipe joints 3 are mounted to either side thereof and are connected with each other by an interconnecting pipe 19 which is inserted into the through-hole 2. Thus, the through-hole 2 is sealed in both sides by the flanges 7 of the pipe joints 3 to prevent leakage of smoke, flame or gas therethrough in a horizontal pipeline. A pipe joint 3 may also be applied to the lower surface of the slab 1 to improve the sealing of the through-hole 2 in a vertical pipeline.

Figure 11:
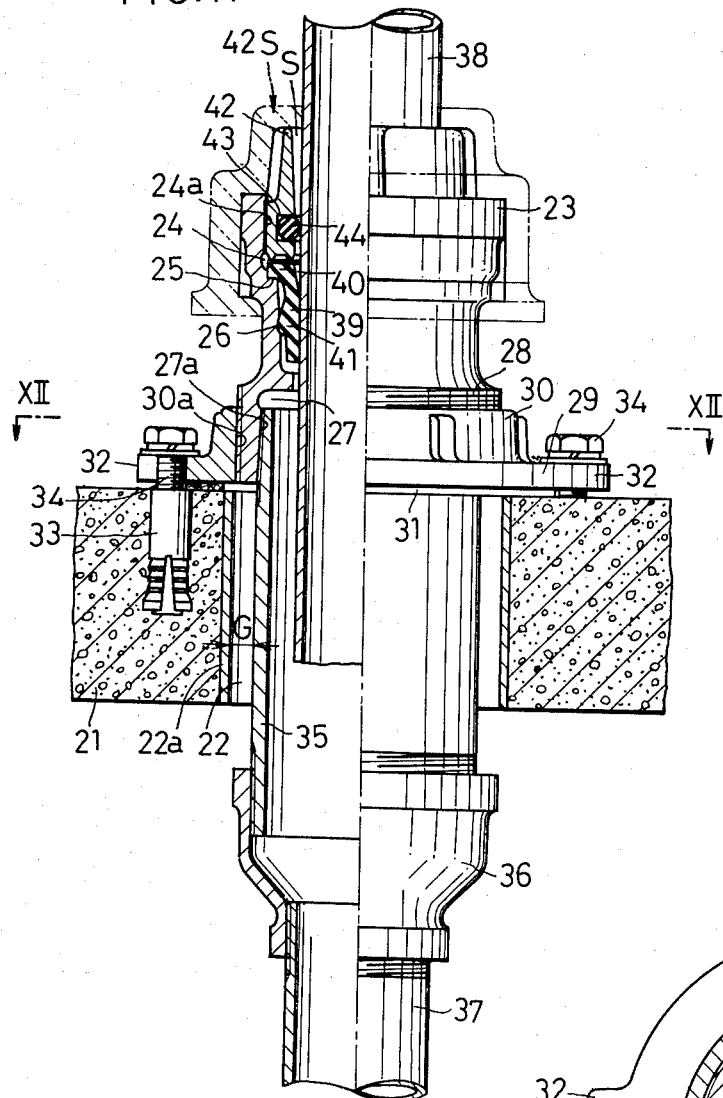
FIG. 11 is a fragmentary front elevational view partly in section of a pipeline showing still another embodiment of the present invention.
Figure 12:
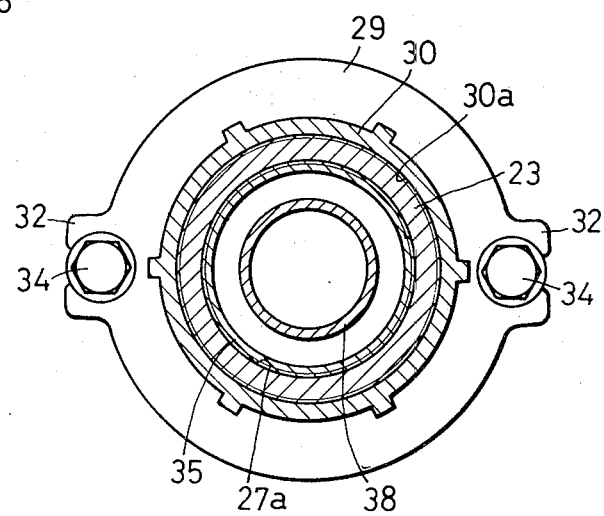
FIG. 12 is a cross-sectional view taken along the line XII—XII of FIG. 11.

Referring now to FIGS. 11 and 12 showing still another embodiment of the present invention, a sleeve 22a is fitted in a through-hole 22 provided in a concrete slab 21 defining a gap G between the inner periphery of the sleeve 22a and the outer periphery of an interconnecting pipe 35. A cylindrical pipe joint 23 comprises an upper central bore 34 provided with an upper internal thread 24a in which an attachment 42 is engaged, stepped engage surfaces 25 and 26 provided in the central portion to fit upper and lower flanges 40 and 41 of a flexible packing 39 and a lower central bore 27 provided with a lower internal thread 27a to fit the upper portion of the interconnecting pipe 35. The pipe joint 23 further comprises an external thread 28 in the lower portion of the outer periphery thereof to adjustably fit an internal thread 30a provided in a boss 30 of a movable flange 29. The movable flange 29 is large enough in diameter to sea the through-hole 22 by pressing the upper surface of the slab 21 via a gasket 31.

The movable flange 29 is secured to the slab 21 at a diametrically opposite pair of forked lugs 32 projecting from the outer periphery thereof by a pair of bolts 34 which are inserted into a pair of hole-in anchors 33 provided in the slab 21. The lower portion of the interconnecting pipe 35 is connected with a funnel-shaped joint 36, which is, in turn, connected with the upper portion of a lower main pipe 37. An upper main pipe 38 is inserted through the upper central bore 24 of the pipe joint 23 sufficiently deep to absorb displacement in the axial direction. The flexible packing 39 is provided in the form of a tapered cone having the upper and lower flanges 40 and 41 which fit the stepped engage surfaces 25 and 26 of the pipe joint 23. The packing 39 is inserted between the inner periphery of the pipe joint 23 and the outer periphery of the upper main pipe 38 to press the upper main pipe 38 by the attachment 42 through engagement of the upper and lower flanges 40 and 41 with the engage surfaces 25 and 26 so as to seal the sapce between the pipe joint 23 and the main pipe 38 in an air-tight manner.

In construction, the sleeve 22a is fitted in the through-hole 22 of the slab 21 in which the hole-in anchors 33 are inserted. Then the flange 29 is moved to a certain position and the pipe joint 23 is connected with the interconnecting pipe 35, and thereafter the interconnecting pipe 35 is inserted into the sleeve 22a with insertion of the gasket 31 between the lower surface of the flange 29 and the upper surface of the slab 21.

The main pipe 37 is connected with the funnel-shaped joint 36 at the upper end thereof, mounted with a multithread pipe joint 45 for branch pipes at an intermediate portion (see FIG. 13), and fitted with the attachment 42 having the flexible packing 39 and the O-ring packing 44 therein at the lower end. The pipe assembly thus prepared is hereinafter indicated by P.

Figure 13:
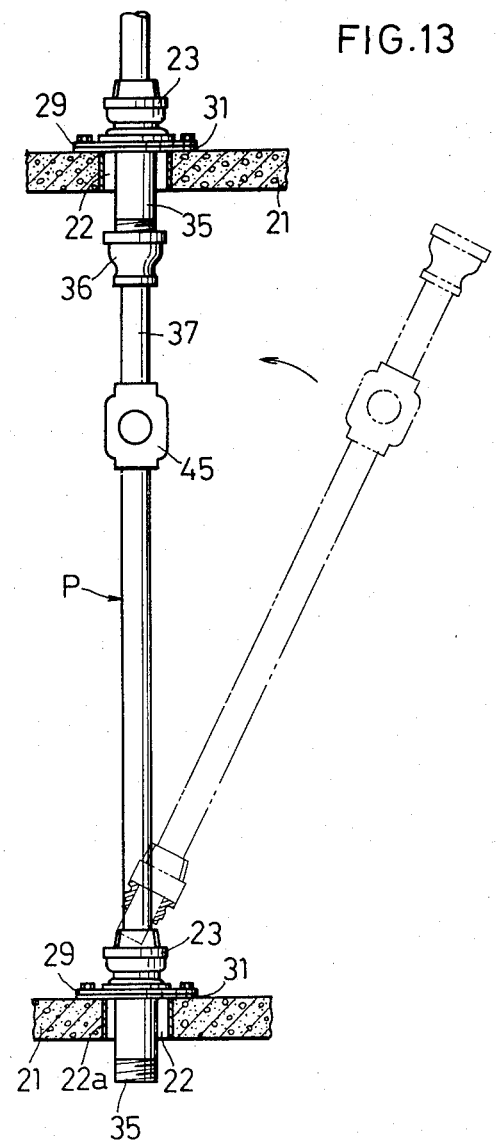
FIG. 13 is a front elevational view showing the piping work in which pipes are vertically connected by the pipe joints of FIG. 11.

The lower end of the pipe assembly P is inserted into the pipe joint 23 in the lower story while the funnel-shaped joint 36 in the upper end of the pipe assembly P receives the lower end of the interconnecting pipe 35 as shown in FIG. 13. The pipe assembly P is set so as to enable the multithread pipe joint 45 to be connected with branch pipes (not shown). Thereafter the flange 29 is moved to press the slab 21 via the gasket 31, and secured to the slab 21 by the bolts 34. The through-hole 22 is completely sealed by the flange 29 to prevent spread of fire or leakage of toxic gas when or fire without back-filling of the through-hole 22. The flange 29 is movable along the pipe joint 23 so as to absorb displacement of the pipe joint 23 caused by difference of the main pipe 37 in the axial length thereof.

The pipe joint 23 is movably connected to the main pipe 37 by the flexible sealing packing 39 and the O-ring packing 44, and movably supported against the slab 21 by the gasket 31. Thus, the longitudinal differences, axial deviations and angular differences that may develop between the pipe assemblies P are effectively absorbed in each story so as to prevent displacement, contraction and expansion of the pipe assemblies, cracks and severances of the pipes and leakage of fluid from the pipes.

This embodiment of the present invention may be modified to connect pipes horizontally through partition walls. Further, the pipe 37 can directly be connected with the pipe joint 23 by itself not as a pipe assembly P.

Figure 14:
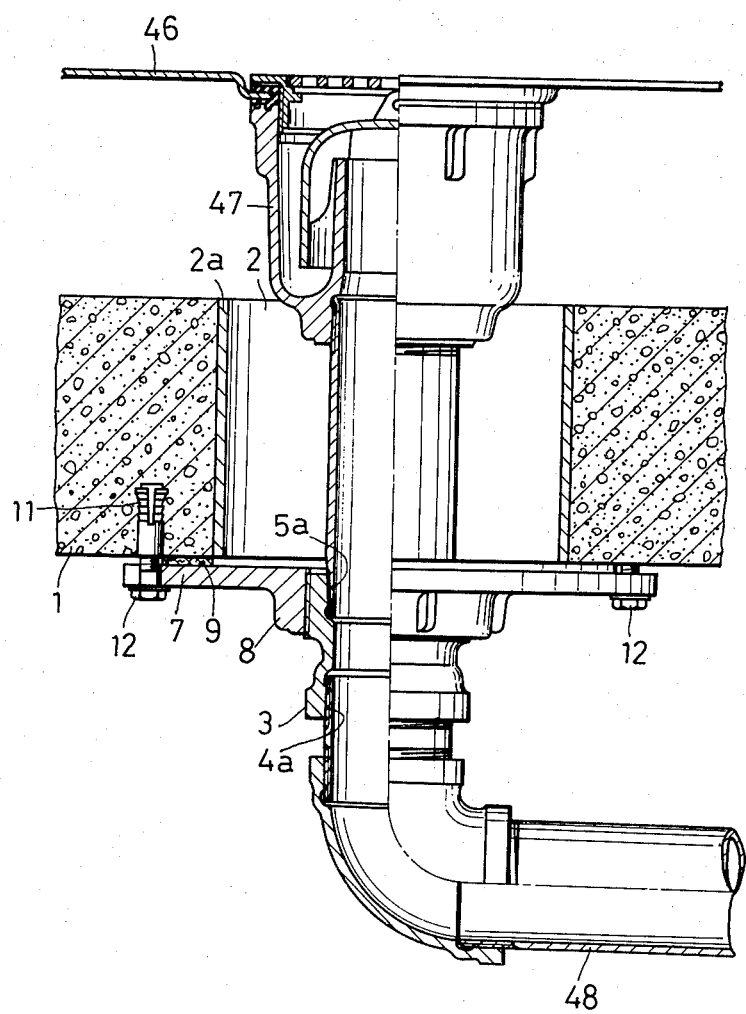
FIG. 14 is a fragmentary front elevational view showing the pipe joint applied to a bathroom unit.

This embodiment of the present invention can be applied to a bathroom unit as shown in FIG. 14. In a conventional bathroom unit, a waterproof pan 46 is mounted with a joint 47 which is connected with a drain pipe 48 via a through-hole 2 provided in a slab 1, and the space between the through-hole 2 and the drain pipe 48 is filled with mortar, cement, etc. However, this backfilling work is very difficult and is done upwards against the slab 1 leading to falling of mortar or cement. This disadvantage may be overcome by providing a pipe joint 3 of the present invention under the slab 1 to seal the through-hole 2 by a flange 7 to prevent leakage of air therethrough without necessity of back-filling. In this case, the through-hole 2 may be filled with fireproof material such as asbestos to shut off spread of fire through the through-hole 2. This embodiment may also be applied to a feed pipe extending toward the waterproof pan 46 through a partition wall.

Figure 15:
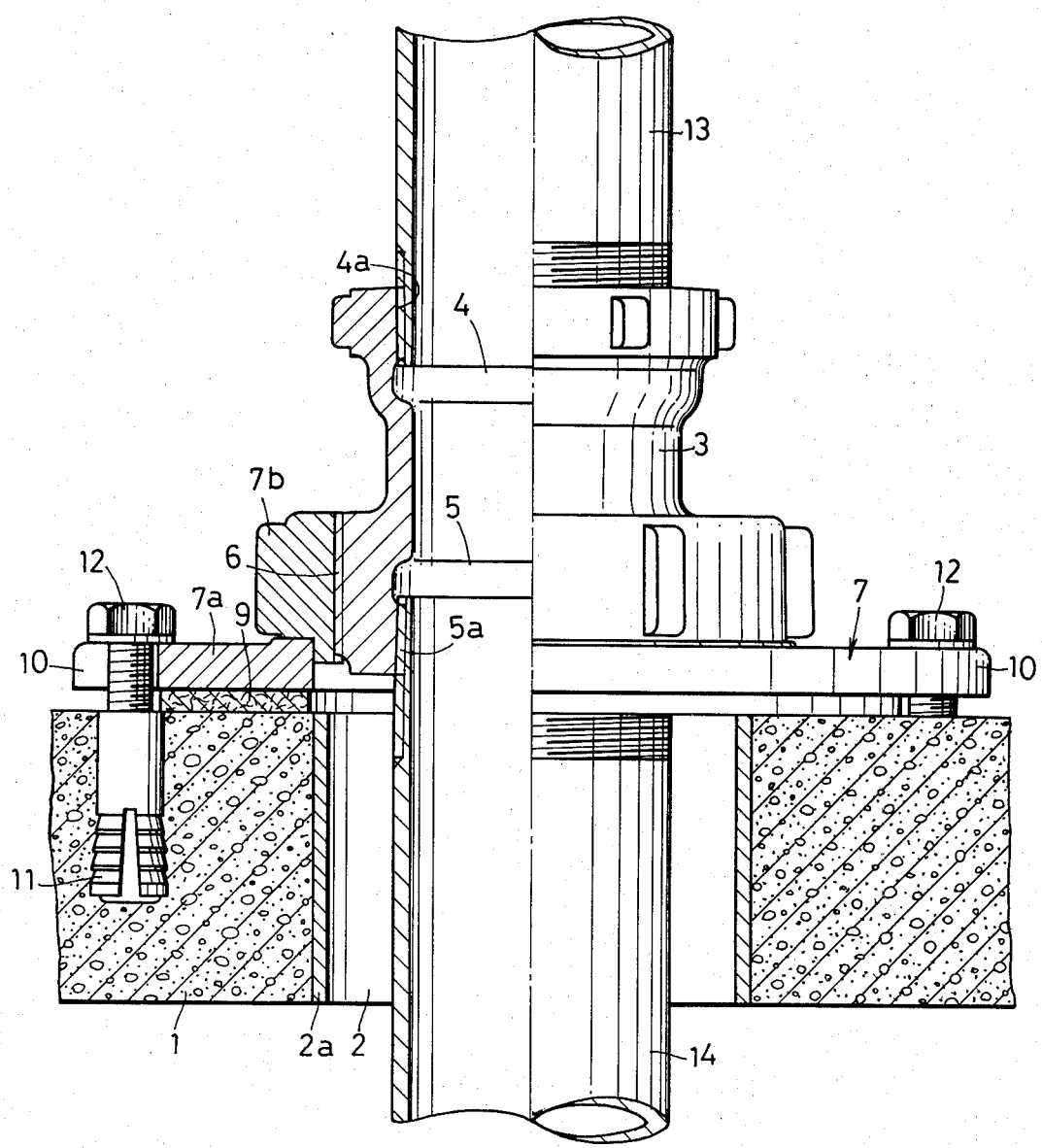
FIGS. 15 to 17 are fragmentary front elevational views showing modifications of the pipe joint of FIG. 11.
Figure 16:
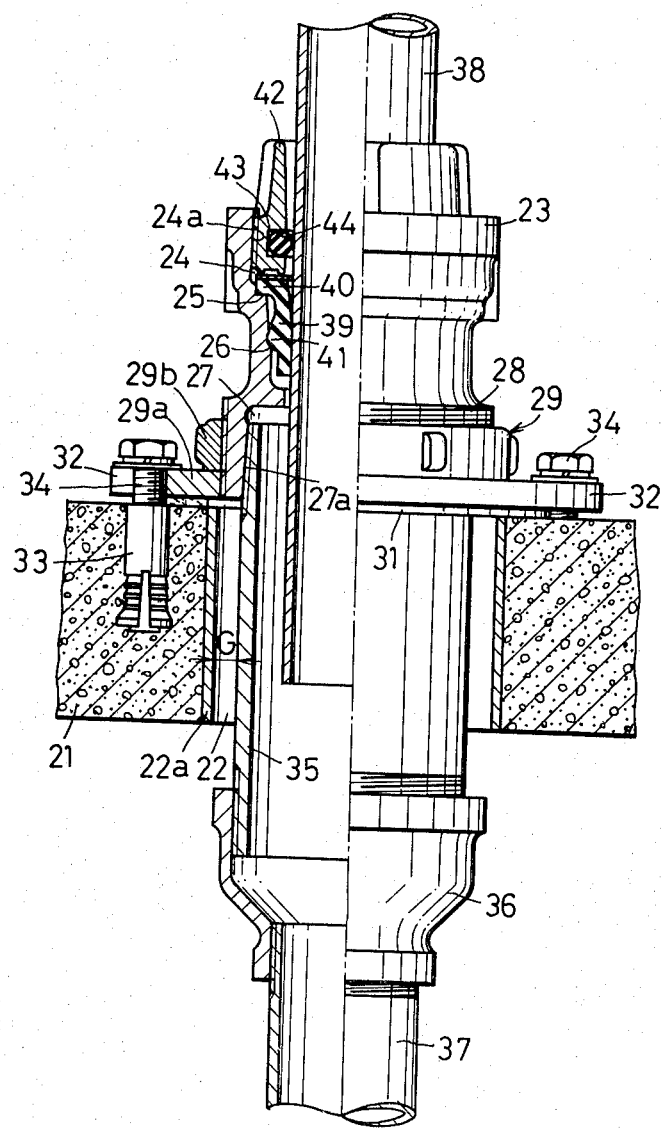
Figure 17:
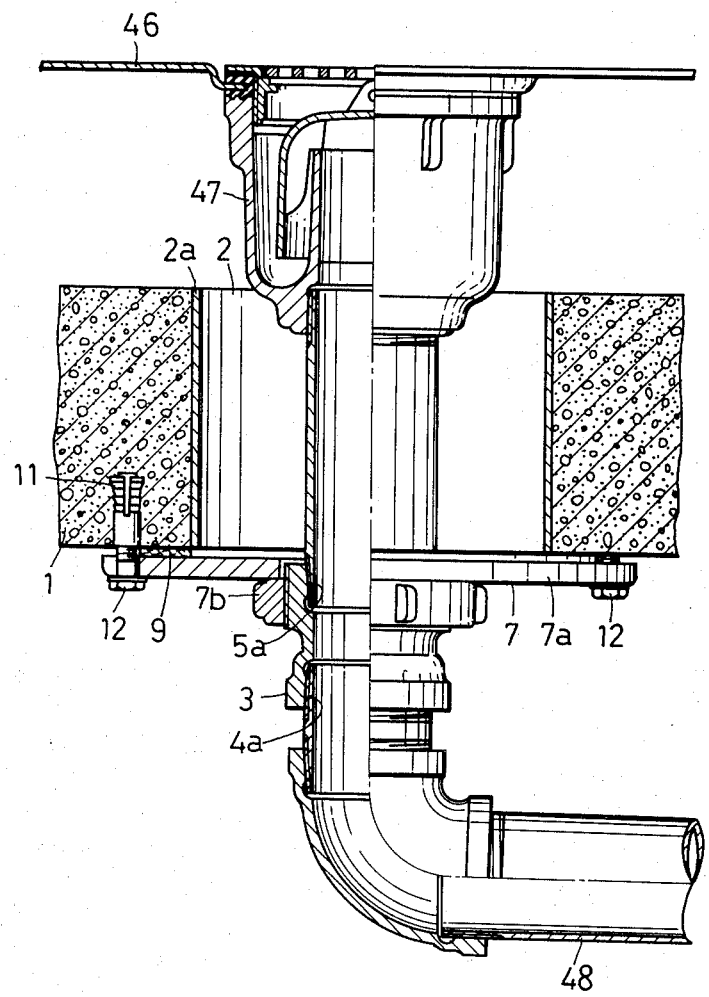

FIGS. 15 to 17 show modifications of the aforementioned embodiment in which movable flanges 7, 29 comprise flange portions 7a, 29a fitted with the outer peripheries of pipe joints 3, 23 and nuts 7b, 29b threaded with external threads 6, 28 of the pipe joints 3, 23 to press slabs 1, 21 without moving the flange portions 7a, 29a and prevent distortion or displacement of gaskets 9, 31 inserted between the flanges 7, 29 and the slabs 1, 21.

The flanged pipe joint of the present invention can be provided as an L-joint, a T-joint or a YT-joint, and the L-joint is particularly effective in a low-ceiled building.

While the invention has been described with reference to a few embodiments thereof, it is to be understood that modifications or variations may be easily made without departing from the scope of this invention which is defined by the appended claims.

I claim:

1. A method of assembling a pipeline in a building, which pipeline extends through floors or walls of said building, comprising:
   providing pipes,
   making a through-hole in a wall or floor portion of said building having a diameter larger than said pipes,
   providing a pipe joint having a flange larger than said through-hole and including means for transverse adjustment thereof on said wall or floor portion and for engagement by anchoring means to secure said pipe joint in a selected one of a plurality of possible positions, said pipe joint comprising means for receiving a pipe non-perpendicularly relative to the plane of the flange,
   providing anchor means in said wall or floor portion in position to engage said flange when said pipe joint is positioned substantially coaxially or somewhat mis-aligned with said through-hole,
   placing an elastic gasket on said wall or floor portion about said through-hole to accommodate tilting,
   placing said pipe joint in position with the flange engaging said elastic gasket and said adjustment means of said flange being adjacent said anchor means, said pipe joint extending away from said through-hole,
   securing a pipe to said pipe joint, said pipe extending in said through-hole,
   effecting lateral adjustment of said pipe and pipe joint, and
   thereafter fixing said flange in a selected position by operation of said anchor means.

2. The method of claim 1, and further comprising:
   making a second through-hole in a second wall or floor portion next adjacent said first mentioned wall or floor portion and in approximate alignment therewith,
   providing a second pipe joint like the aforementioned pipe joint,
   providing second anchor means in said second wall or floor portion in position to engage the flange of said second pipe joint when said second pipe joint is positioned substantially coaxially with said second through-hole,
   placing a second elastic gasket on said second wall or floor portion about said second through-hole.
   placing said second pipe joint in position with the flange thereof engaging said second elastic gasket, said adjustment means of said flange being adjacent said second anchor means and said second pipe joint extending away from said second through-hole,
   providing a pipeline,
   inserting one end of said pipeline into said second pipe joint,
   connecting the other end of said pipeline to said pipe.

* * * * *